United States Patent [19]

Blankenhorn et al.

[11] 4,109,033

[45] Aug. 22, 1978

[54] PROCESS FOR IMPREGNATING CONCRETE WITH POLYMERS

[76] Inventors: Paul R. Blankenhorn, 106 Horseshoe Cir., Pennsylvania Furnace, Pa. 16865; Philip D. Cady, P.O. Box 158, Lemont, Pa. 16851; Donald E. Kline, 1210 E. Branch Rd., State College, Pa. 16801; Richard E. Weyers, 3276 Highridge Trail, Madison, Wis. 53713

[21] Appl. No.: 768,022

[22] Filed: Feb. 14, 1977

Related U.S. Application Data

[63] Continuation-in-part of Ser. No. 584,249, Jun. 6, 1975, abandoned.

[51] Int. Cl.$^2$ .............................................. B05D 3/02
[52] U.S. Cl. ........................................ 427/314; 73/73; 404/77; 404/79; 427/136; 427/384; 427/385 C; 427/386
[58] Field of Search ............... 427/314, 136, 384, 386, 427/385 C, 377; 428/538; 404/77, 79, 95; 73/73

[56] References Cited

U.S. PATENT DOCUMENTS

| | | | |
|---|---|---|---|
| 2,534,279 | 12/1950 | Liberthson | 73/73 |
| 2,657,153 | 10/1953 | Russell | 427/385 |
| 2,718,141 | 9/1955 | Richards | 73/75 |
| 3,030,664 | 4/1962 | Wijard | 427/377 |
| 3,085,907 | 4/1963 | Zdanowski et al. | 427/385 |
| 3,145,502 | 8/1964 | Rubenstein | 427/385 |
| 3,255,032 | 6/1966 | Grant et al. | 427/314 |
| 3,334,555 | 8/1967 | Nagin et al. | 427/136 |
| 3,410,185 | 11/1968 | Harrington | 404/77 |
| 3,411,940 | 11/1968 | Lopez et al. | 427/136 |
| 3,516,847 | 6/1970 | Schuster et al. | 427/314 |
| 3,516,955 | 6/1970 | Taft | 427/386 |
| 3,583,880 | 6/1971 | Moren et al. | 427/314 |
| 3,826,680 | 7/1974 | Rio et al. | 427/385 |

FOREIGN PATENT DOCUMENTS

| | | | |
|---|---|---|---|
| 12,852 of | 1898 | United Kingdom | 427/314 |
| 170,497 | 10/1921 | United Kingdom | 427/314 |
| 785,758 | 11/1957 | United Kingdom | 427/314 |
| 125,506 | 4/1960 | U.S.S.R. | 427/314 |

*Primary Examiner*—Ronald H. Smith
*Assistant Examiner*—Sadie L. Childs
*Attorney, Agent, or Firm*—Paul Lipsitz

[57] ABSTRACT

A process for drying concrete to the appropriate moisture content for proper impregnation of the concrete with a polymer or a monomer for in situ polymerization. This is accomplished by heating the concrete until its temperature at the desired depth of polymer penetration is at least about 230° F. In another embodiment of the invention the dried concrete is impregnated with a monomer composition capable of polymerization and is polymerized within the concrete.

8 Claims, No Drawings

PROCESS FOR IMPREGNATING CONCRETE WITH POLYMERS

This is a continuation-in-part of Ser. No. 584,249 filed June 6, 1975 and now abandoned.

It is well known in the art to coat concrete surfaces to make them non-porous with various resins such as acrylic, epoxy and other polymers. U.S. Pat. No. 3,516,847, for example, discloses the coating of concrete and like materials, particularly asbestos-cement articles, with various polymers by heating the surface of the article to at least about 300° F., then cooling to about 130° to 275° F. before applying the resin. Articles treated by this method are generally of small size such as siding shingles, panels, and also the walls of pipes.

It is also well known in the art to impregnate concrete with various monomers such as acrylic monomers and then to polymerize the monomer in situ to obtain concrete with improved physical properties. Much of this work has been reported by Steinberg et al and is exemplified in the article "The Preparation and Characteristics of Concrete-Polymer Composites," BNL Report #14350 1970. For example, it has been reported that concrete impregnated with methyl-methacrylate displays significant increase in compressive strength, elastic modulus, and durability.

It is known in the art of the polymer impregnation of concrete that prior to impregnation the concrete should be dried, preferably until the moisture content of the concrete is on the order of about 0.5%. However, in dealing with large slabs of concrete to be impregnated in the field, such as bridge decks and roadways, it will be readily appreciated that numerous problems will be encountered both in drying the concrete and determining just when the concrete is at the correct moisture content prior to impregnation of the resin monomer. No method has heretofore been available to determine just when the large concrete mass is sufficiently dry to be impregnated. It is impossible to put the large concrete mass in an oven, and just applying heat to the surface is meaningless unless it is known when the interior of the concrete is sufficiently dry to receive the monomer. Heretofore, it was necessary to take continuous core samples and measure the moisture content. This, of course, can destroy a large area of the concrete surface and further is time-consuming and expensive. Now, applicants have found that by heating the concrete to a minimum measured temperature, said minimum temperature being achieved at the depth to which impregnation is desired, the monomer can effectively diffuse through the concrete and after polymerization and curing, give a concrete with the desired properties.

It is an object of this invention to provide a simple means of determining the appropriate time at which the concrete is sufficiently dry for impregnation. This procedure saves time and drying energy and also prevents damage to the concrete product.

It is a further object of this invention to provide a novel process for impregnating concrete with a monomer and then effecting polymerization of the monomer to give a concrete of superior properties.

In accord with the invention a method is provided for determining the appropriate moisture content of large, thick bodies of concrete prior to impregnation with a monomer which comprises heating said concrete until the measured temperature at the desired depth of monomer penetration is at least about 230° F. In a preferred embodiment of the invention the dried concrete is impregnated with a monomer composition capable of polymerization and is polymerized within the concrete.

The process of the invention is particularly suitable for the impregnation of large volumes of concrete such as roadbeds, walkways, bridge decks, and the like, which are subject to both abrasive traffic and weathering which tends to erode and destroy the concrete surface.

It is to be understood that the polymer monomers which will be used in the process of the invention include liquid monomers such as those of vinyl, acrylic, methacrylic, styrene, and like materials which can be made to polymerize, all of which have been used heretofore to impregnate concrete. Also included as polymer monomers are polyepoxides in liquid form which also may be polymerized in situ after impregnation in the concrete. Also of value as a polymer monomer are such materials as linseed oil, tung oil and the like which become polymerized after impregnation. It is also to be understood that the concrete may be impregnated with liquid polymers which need not be polymerized further. Thus, for example, a polyethylene glycol having a molecular weight of about 1000 may be used to impregnate concrete and will give the concrete improved properties. Preferably, however, a liquid monomer which is polymerized in situ will be used.

In carrying out the process of the invention, a hole is bored into the concrete section to the desired depth of penetration. A temperature-indicating device, such as a thermocouple, is inserted in the hole and is used to monitor the heating procedure. Heating means such as gas-fired infrared heaters are then activated and maintained until the thermocouple or other temperature-indicating device indicates a temperature of at least about 230° F. Alternate heating techniques will include gas-fired heaters, microwave techniques, open flames, and the like, but preferably gas-fired infrared heaters will be used. In carrying out the process it is sufficient to carry out the heating step until a temperature of about 230° F. to about 250° F. and no higher temperatures need be reached. In any event, temperatures about 600° C. at the surface of the concrete should be avoided since damage to the concrete might result.

When a temperature of at least about 230° F. is reached, the heating is stopped and the liquid material is then poured onto the concrete in sufficient amount to provide the desired penetration. In order to aid in the impregnation step, a metal containment frame surrounding the perimeter of the heated area is secured over the dry concrete area. Preferably, the frame may be secured to the surface using a silastic rubber compound. The concrete is allowed to cool to ambient conditions (which will require about 12 hours) and then the liquid monomer system is poured on the concrete surface. After the monomer system is added, the top of the frame is preferably enclosed with a cover such as a clear polyethylene sheet completely taped around the side, as such a procedure will keep evaporation of the monomer to a minimum. The use of a closed system will enable impregnation to be carried out under pressure if desired to increase the rate of penetration.

The amount of monomer to use for the desired penetration of the concrete is easily determined from knowledge of the porosity of the concrete (which will be known by the skilled art worker from the specifications of the concrete with which he is working) and the volume of concrete to be treated. Usually, however, an excess of the monomer will be applied to the concrete surface and the excess removed when it is clear from visual observation or by measurement that no further penetration is occurring.

When the impregnation is deemed complete, any excess monomer on the surface of the concrete is removed by pumping it off or otherwise sucking it up into a storage container. After the monomer is removed, the polymerization step must be made to occur and this is readily accomplished by thermally triggering the monomer. A convenient method to accomplish this is to place and continue to circulate hot water on the surface of the concrete thereby initiating polymerization since the monomer formulation will contain the appropriate heat-sensitive catalyst. For example, where methylmethacrylate monomer is used, an appropriate monomer system may include heat-sensitive azo-bis isobutyronitrile as catalyst. Thus, as indicated, after the excess monomer is removed, water at a temperature of about 185° F. or higher is placed within the containment frame to a minimum depth of about 7 inches. Immersion heaters of 1000 to 2500 watts or other heat sources together with a stirrer, if needed, are then placed in the water and the bath temperature maintained at 185° F. minimum. It is desirable to surround the frame with insulation in order to maintain the high bath temperature. The use of initial hot water, as described above, is desirable since it effects immediate surface polymerization, thereby eliminating any loss of monomer at the surface. Other methods of triggering the polymerization of the monomer system may be used, as for example, infrared or other heaters, but the hot water system is preferred because it rapidly brings the surface to a temperature above the triggering temperature for polymerization and polymerizes a film on the surface to avoid or reduce evaporation.

As indicated, the process of the invention is dependent upon drying the concrete and the proper degree of drying is determined by the temperature at the depth of desired monomer penetration rather than by a moisture gauge or other method of analysis of the concrete. Thus, the method of the invention makes it convenient to carry out concrete polymer impregnation of concrete in the field without time-consuming, costly, off-site chemical analysis. As indicated, all that is required by the process of the invention is to place a thermocouple or other temperature-indicating device at the desired depth of monomer penetration and heat (e.g. dry) the concrete until a temperature of at least 230° F. is obtained.

In order to further illustrate the invention the following example is given.

EXAMPLE

A section of a reinforced concrete bridge deck having a concrete thickness of 7.5 inches was used for test. A rectangular section (2.5 feet × 1.5 feet) of the deck was cleaned off and a metal frame enclosure was erected around the perimeter. A 0.25 inch hole, 4 inches deep was drilled in the concrete and a thermocouple inserted at the bottom of the hole. Then, a bank of infrared heaters was placed over the rectangular section which was at an ambient temperature of 31° F. and the area heated. When the thermocouple registered 231° F. after about 10 hours, it was indicative that drying equilibrium of the concrete had been obtained. The heaters were then removed and the enclosure removed and replaced with a metal containment frame (2.5 × 1.5 × 1foot) which was secured to the dried area with a silastic rubber compound. The concrete was allowed to cool to ambient conditions which required about 12 hours and then the liquid monomer system was placed on the concrete within the frame. The monomer system used consisted of 100 parts by weight of methylmethacrylate, 10 parts of trimethylol propane trimethacrylate and 0.5 parts of azo-bis isobutyronitrile, the total volume of the mixture being about 1 gallon. The top of the enclosure was covered with a clear polyethylene sheet which was taped around its sides in order to keep evaporation of the monomer to a minimum.

After 4 days the impregnation was judged complete because the excess liquid remaining on the concrete surface did not decrease in volume, and the excess monomer was removed from the surface of the concrete. Then, water at a temperature of at least 185° F. was placed on the concrete within the frame to a depth of 7 inches. Electrical immersion heaters (1000–2500 watts) and a stirrer were then placed in the water which was agitated while maintaining the water temperature at at least 185° F. and this was aided by surrounding the frame with insulating pads. Polymerization of the monomer was complete after being held for 10 hours at a temperature of at least 130° F. The absence of the odor of the methacrylate monomer was a good indication of completed polymerization.

A core sample of the polymer impregnated concrete obtained by the above procedure was subjected to visual observation. Complete penetration of the polymerized monomer was found to be from $3\frac{3}{8}$ to $4\frac{1}{2}$ inches, which represents from 7.3 to 9.8% of the concrete volume. A less dense penetration of about 1 to 1.5 inches below the complete penetration area was also evident.

We claim:

1. In the process of impregnating large volumes of concrete in the field, such as roadbeds, walkways, and bridge decks, with a polymer or a monomer for in situ polymerization wherein it is necessary to dry said concrete prior to impregnation, the improvement of employing a temperature measurement to determine moisture content which comprises
   (1) determining the appropriate dryness for impregnation of said concrete by heating said concrete until a temperature-indicating device below the surface and within the concrete at the desired depth of monomer penetration indicates a minimum temperature of about 230° F., and
   (2) impregnating the concrete to the desired depth with said polymer or monomer composition.

2. The process of claim 1 where the concrete is impregnated with a polyethylene glycol having a molecular weight of about 1000.

3. In the process of impregnating large volumes of concrete in the field, such as roadbeds, walkways, and bridge decks, with a monomer for in situ polymerization wherein it is necessary to dry said concrete prior to impregnation, the improvement of employing a temperature measurement to determine moisture content which comprises
   (1) determining the appropriate dryness for impregnation of said concrete by heating said concrete until a temperature-indicating device below the surface and within the concrete at the desired depth of monomer penetration indicates a minimum temperature of about 230° F.
   (2) impregnating the concrete to the desired depth with a monomer composition capable of polymerization, and (3) polymerizing the monomer within the concrete.

4. The process of claim 3 where the monomer is an acrylic monomer.

5. The process of claim 3 where the acrylic monomer is methylmethacrylate.

6. The process of claim 3 where the monomer is a styrene monomer.

7. The process of claim 3 where the monomer is an epoxy resin monomer.

8. The process of claim 3 where the monomer is linseed oil.

* * * * *